(12) United States Patent
Huang (10) Patent No.: US 7,467,242 B2
(45) Date of Patent: Dec. 16, 2008

(54) METHOD AND SYSTEM FOR DYNAMIC FIFO FLOW CONTROL

(75) Inventor: Hsilin Huang, Milpitas, CA (US)

(73) Assignee: Via Technologies, Inc., Taipei (TW)

( * ) Notice: Subject to any disclaimer, the term of this patent is extended or adjusted under 35 U.S.C. 154(b) by 1155 days.

(21) Appl. No.: 10/436,790

(22) Filed: May 13, 2003

(65) Prior Publication Data

US 2004/0240482 A1    Dec. 2, 2004

(51) Int. Cl.
*G06F 3/00* (2006.01)

(52) U.S. Cl. .............. 710/52; 710/53; 710/54; 710/55; 710/56; 710/57; 710/29

(58) Field of Classification Search ............ None
See application file for complete search history.

(56) References Cited

U.S. PATENT DOCUMENTS

5,907,716 A    5/1999 Yoshimura

*Primary Examiner*—Alan Chen
(74) *Attorney, Agent, or Firm*—Thomas, Kayden, Horstemeyer & Risley (57) ABSTRACT

Method and system for a dynamic FIFO flow control circuit. The dynamic FIFO flow control circuit detects one or more obsolete entries in a FIFO memory, retrieves the address of the next valid read pointer, and reads from the retrieved address during the next read operation.

50 Claims, 8 Drawing Sheets

METHOD AND SYSTEM FOR DYNAMIC FIFO FLOW CONTROL

BACKGROUND OF INVENTION

1. Field of Invention

The present invention relates generally to computer systems. More particularly, the present invention relates to a flow control circuit capable of dynamically detecting and avoiding obsolete data entry read operations in a First In First Out (FIFO) memory.

2. Related Art

Data transfer in most computer systems is typically conducted between a sending element and a receiving element according to a handshake protocol. In computer systems, data is often transmitted from the sending element at a higher rate than it can be consumed at the receiving element. In order to facilitate data communication between the sending element and the receiving element, high-speed buffers such as First In First Out (FIFO) devices are used.

A FIFO device typically comprises a plurality of serially arranged storage cells (or memory locations) which are sequentially written into and read from. A write address pointer holds the write binary address of the storage cell into which data will be written during the next write operation, and a read address pointer holds the read binary address of the storage cell from which data will be read during the next read operation.

Figure 1:
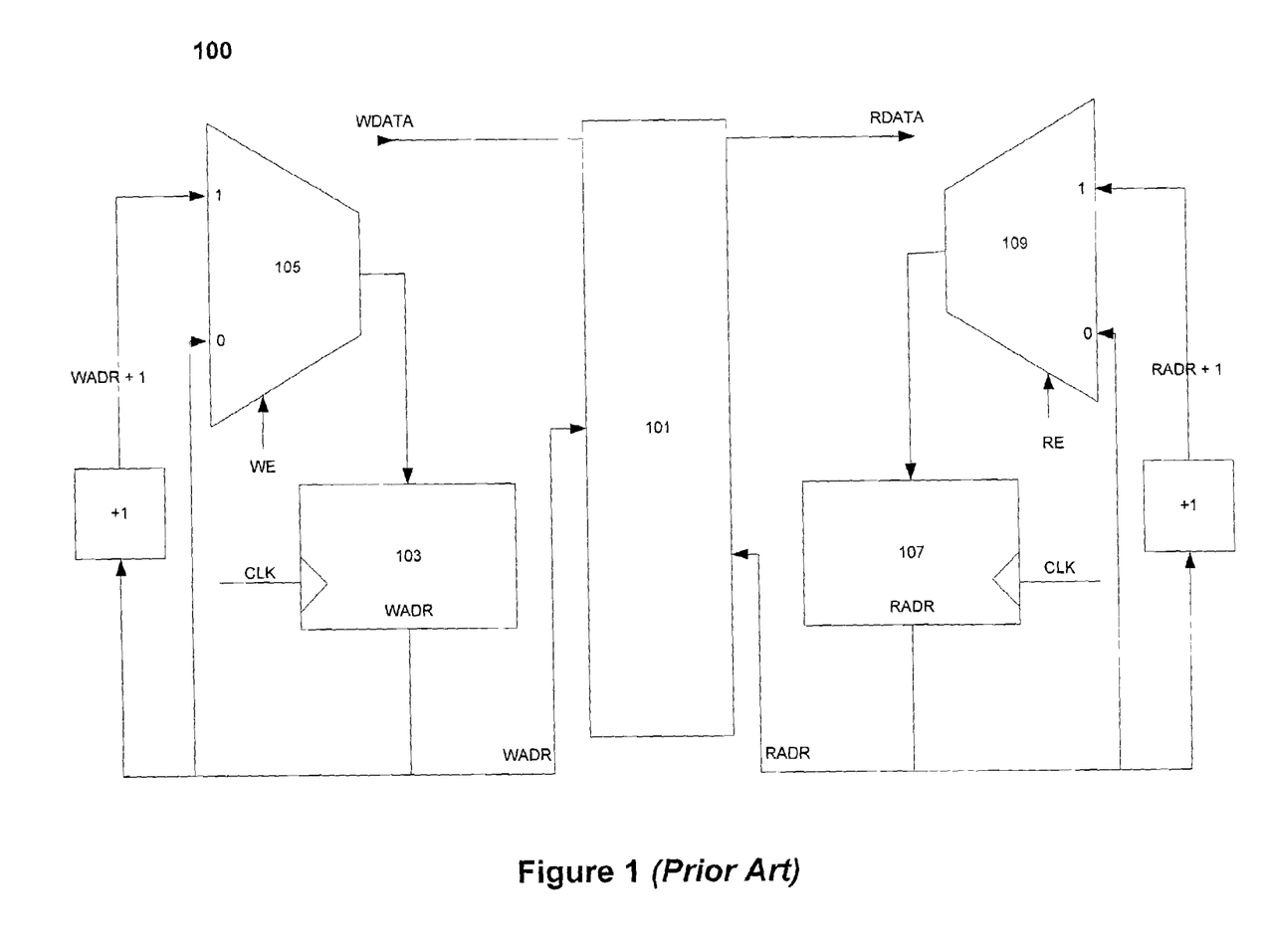
FIG. 1 is a prior art architectural diagram illustrating a conventional FIFO memory circuit.

FIG. 1 illustrates a conventional FIFO device 100. FIFO device 100 comprises a FIFO memory element 101, a write address circuit 103, a write multiplexer 105, a read address circuit 107, and a read multiplexer 109. Moreover, memory element 101 may be a Random Access Memory (RAM) in which reading and writing of data may be performed simultaneously and comprises a capacity of N words. While a read permission signal (RE) is asserted, data (RDATA) is read from an address designated by a read address (RADR) on a word-by-word basis at a clock timing of a clock signal (CLK). Similarly, while a write permission signal (WE) is asserted, data (WDATA) is written into an address designated by a write address (WADR) on a word-by-word basis at a clock timing of the clock signal CLK.

The read address circuit 107 receives the clock signal CLK and the read permission signal (RE). While the read permission signal (RE) is asserted, the read address circuit 107 increments the read address (RADR) by one at a clock timing of the clock signal CLK.

The write address circuit 103 receives the clock signal CLK and the write permission (WE). While the write permission signal (WE) is asserted, the write address circuit 103 increments the write address (WADR) by one at a clock timing of the clock signal CLK.

The conventional FIFO control circuit illustrated in FIG. 1 may be used to facilitate the data rate discrepancy between the sending element and the receiving element. However, such conventional FIFO control circuits do not detect or discard obsolete data stored in the FIFO memory, and therefore require additional read cycles to process obsolete data that need not be read.

SUMMARY OF INVENTION

Accordingly, the present invention provides a dynamic FIFO flow control circuit and a method of performing. In one embodiment of the present invention, the flow control circuit detects that the next one or more data entries in a FIFO memory contain obsolete data. The flow control circuit stores the address of the next valid read pointer in a register, the address of the next valid read pointer is then loaded from the register to read the next data entry during the next read operation.

The FIFO flow control circuit of the present invention allows for detection of obsolete data entries in the FIFO memory and thereby saves reading cycles by skipping the read pointer address to the next valid data entry rather than reading from obsolete data entries.

BRIEF DESCRIPTION OF DRAWINGS

The accompanying drawings that are incorporated in and form a part of this specification illustrate embodiments of the invention and together with the description, serve to explain the principles of the invention.

DETAILED DESCRIPTION OF EXEMPLARY EMBODIMENT(S)

The following description is presented to enable one of ordinary skill in the art to make and use the invention and is provided in the context of a patent application and its requirements. In the following description, specific nomenclature is set forth to provide a thorough understanding of the present invention. It will be apparent to one skilled in the art that the specific details may not be necessary to practice the present invention. Furthermore, various modifications to the embodiments will be readily apparent to those skilled in the art and the generic principles herein may be applied to other embodiments. Thus, the present invention is not intended to be limited to the embodiments shown but is to be accorded the widest scope consistent with the principles and features described herein.

Figure 2:
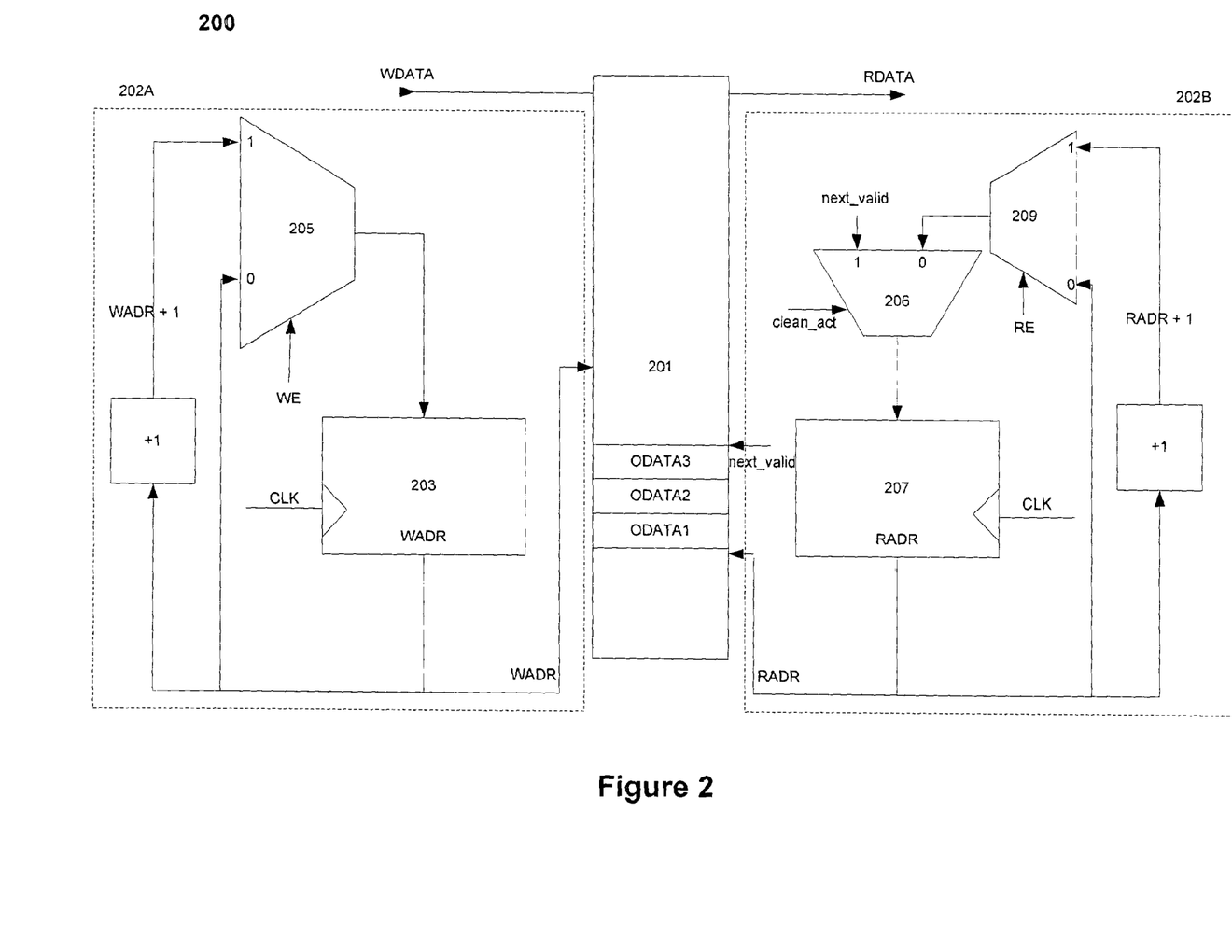
FIG. 2 is an architectural diagram illustrating a dynamic FIFO flow control circuit in accordance to one embodiment of the present invention.

FIG. 2 illustrates a FIFO device 200 according to one embodiment of the present invention. FIFO device 200 comprises: a FIFO memory element denoted 201, a write control circuit denoted 202A, and a read control circuit denoted 202B. Memory element 201 may be a Random Access Memory (RAM) in which reading and writing of data may be performed simultaneously and comprises a capacity of N words.

Write control circuit 202A further comprises a write address circuit denoted 203 and a write multiplexer denoted 205. While a write permission signal (WE) is asserted, data (WDATA) is written into an address designated by a write address (WADR) on a word-by-word basis at a clock timing of a clock signal CLK.

During a write operation, write control circuit 202A receives the clock signal CLK and the write permission (WE). While the write permission signal (WE) is asserted, the write address circuit 203 increments the write address (WADR) by one at a clock timing of the clock signal CLK. Moreover, while the write permission signal (WE) and the clock signal CLK are asserted, multiplexer 205 selects input "1" in order to increment the write address (WADR) by one.

Read control circuit 202B further comprises a read address circuit denoted 207, a first multiplexer 209 and a second multiplexer denoted 206. While a read permission signal (RE) is asserted, data (RDATA) is read from an address designated by a read address (RADR) on a word-by-word basis at a clock timing of the clock signal CLK.

Figure 3:
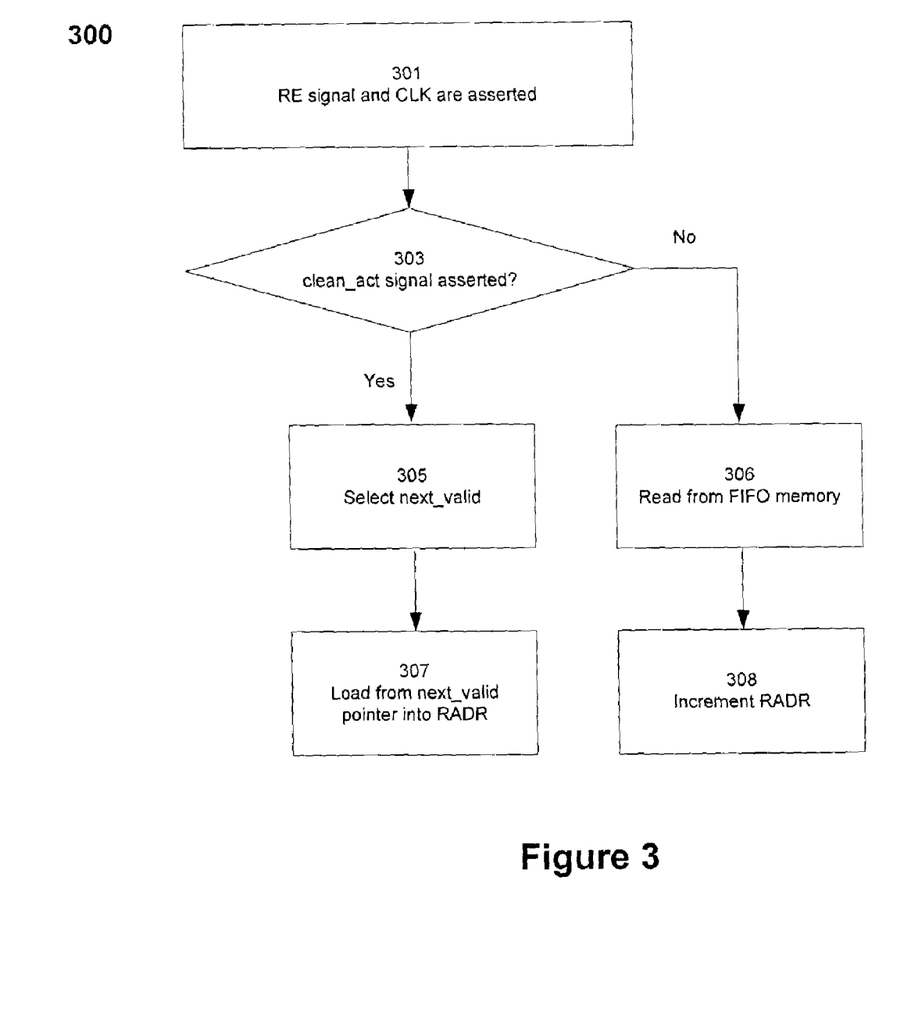
FIG. 3 is a flow chart diagram illustrating a read cycle of a FIFO flow control circuit in accordance to one embodiment of the present invention.

Moreover, read control circuit 202B functions in two modes regulated by multiplexer 206. FIG. 3 illustrates the functional steps of read control 202B. At step 301, the RE and CLK signals are asserted to signify a read operation request. A clean_act signal (shown in FIG. 2) is checked in step 303. An asserted clean_act signal indicates that the next one or more data entries to be read are obsolete such as ODATA1, ODATA2, and ODATA3 shown in FIG. 2. Accordingly, if the clean_act signal is asserted, a next_valid (shown in FIG. 2) pointer is selected in step 305. An address of the next valid data entry held by the next_valid pointer is then loaded and designated as the RADR in step 307. Referring now back to step 303, if the clean_act signal is not asserted, a read operation is performed at the read address RADR, and RADR is subsequently incremented by one in step 308. Moreover, while the read permission signal (RE) and the clock signal CLK are asserted, multiplexer 209 selects input "1" in order to increment the read address (RADR) by one.

Figure 4:
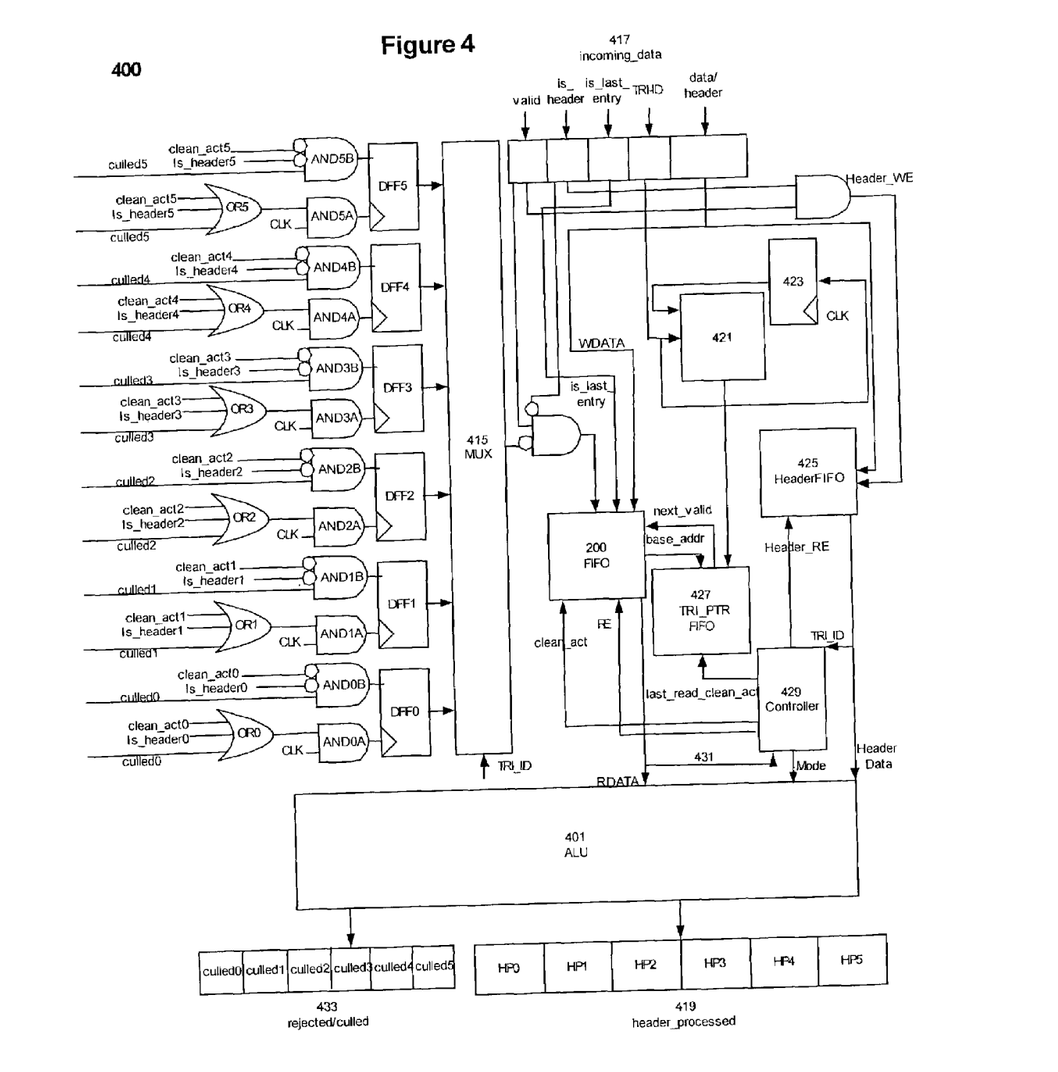
FIG. 4 is an architectural diagram illustrating a control circuit comprising a FIFO device working in conjunction with a TRI_PTR FIFO and a Header FIFO in order to detect and avoid obsolete data entry reads according to one embodiment of the present invention.

FIG. 4 is an architectural diagram illustrating a control circuit comprising a FIFO device such as FIFO device 200 working in conjunction with two conventional FIFO devices TRI_PTR FIFO and Header FIFO according to one embodiment of the present invention. Moreover, FIG. 4 illustrates components comprising: an arithmetic logic unit (ALU) denoted 401, a controller denoted 429, a rejected/culled register denoted 433, a header_processed register denoted 419, a first flip flop denoted DFF0, a second flip flop denoted DFF1, a third flip flop denoted DFF2, a fourth flip flop denoted DFF3, a fifth flip flop denoted DFF4, a sixth flip flop denoted DFF5, a multiplexer denoted 415, an incoming data entry denoted 417, a FIFO device 200 such as shown in FIG. 2, a TRI_PTR FIFO denoted 427, a comparator denoted 421, a flip flop denoted 423, and a Header FIFO denoted 425.

TRI_PTR FIFO 427 and Header FIFO 425 are used in conjunction with FIFO device 200 in order to detect and avoid obsolete data reads in FIFO device 200. Moreover, the interaction between TRI_PTR FIFO 427, Header FIFO 425, and FIFO device 200 is described in detail in FIGS. 5, 6, 7, and 8 below.

FIFO device 200 may be used to store various types of data. In the embodiment shown in FIG. 4, FIFO device 200 receives and stores graphics related data entries. For graphic applications, an image may be represented by numerous primitives, such as triangles. Furthermore, each triangle may be represented by vertices wherein each vertex has coordinates (X, Y, Z, W), color attributes (e.g. specular, ARGB, Diffuse ARGB, etc.), and texture parameters (U,V). Vertex data such as coordinates, attributes, and texture parameters for each triangle are segmented into data entries such as incoming data entry 417 and stored into FIFO device 200.

For each triangle, a header entry is processed and the triangle may be rejected or culled based on the header data contained in the header entry. However, due to various latencies such as pipeline latency, one or more data entries such as an attribute data entry or texture data entry associated with a rejected or culled triangle may be stored in FIFO device 200 before the header is processed. The control circuit shown in FIG. 4 keeps track of the base address of data entries for each triangle in order to avoid data entry reads of a rejected or culled triangle.

In the embodiment shown in FIG. 4, an incoming valid data entry is divided into various segments. Incoming valid entry 417, shown in FIG. 4, comprises a valid bit to signal the validity of the incoming data, an is_header bit for distinguishing a header valid entry from an attribute or texture valid entry, an is_last_entry bit for distinguishing the last valid entry of each triangle, a TRI_ID segment to distinguish data entries of distinct triangles, and a payload denoted data/header comprising triangle data such as header data or attribute data.

Figure 7:
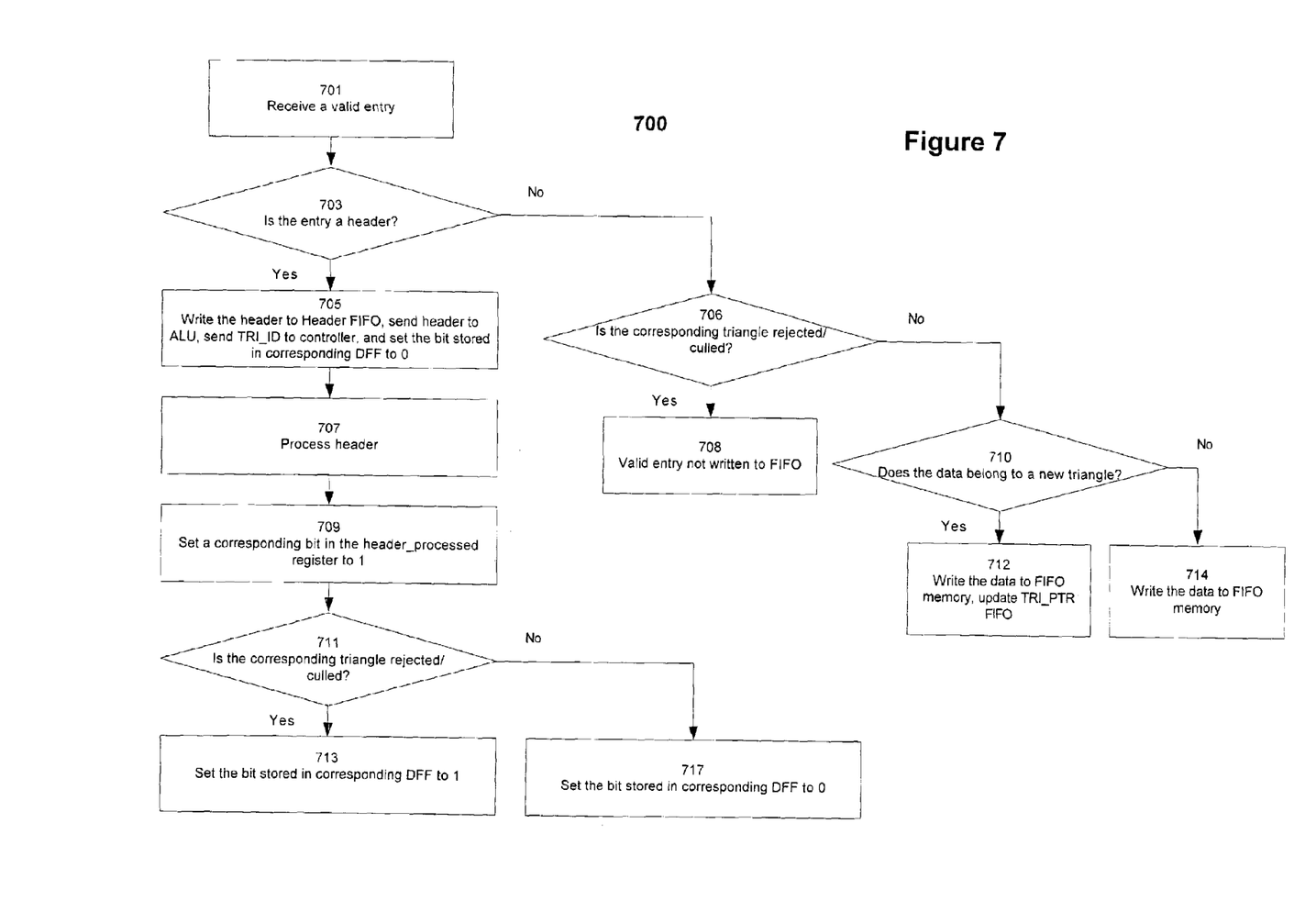
FIG. 7 is a flow diagram illustrating a detailed write operation of the architectural diagram shown in FIG. 4 according to one embodiment of the present invention.

FIG. 7 is a flow chart diagram illustrating functional steps for a write operation in a control circuit such as shown in FIG. 4. In step 701, a valid entry is received at a control circuit such as shown in FIG. 4. In step 703, the header status of the valid entry is determined according to a segment of the valid entry such as the is_header bit shown in FIG. 4. If the valid entry contains valid header data, in step 705, the valid entry is written into a conventional FIFO such as Header FIFO 425. The header entry written into the conventional FIFO comprises the data/header segment as well as identification segments such as TRI_ID, is_header, is_last, etc. The header entry is written into the Header FIFO 425 by enabling a write enable signal Header_WE as shown in FIG. 4. Furthermore, in step 705, the data/header portion of the header entry is read from Header FIFO 425 into an arithmetic logic unit (ALU) such as ALU 401 shown in FIG. 4, and an identification tag such as TRI_ID is read from Header FIFO 425 into a controller such as controller 429. The data and the identification tag are read from Header FIFO 425 by enabling a read enable signal Header_RE as shown in FIG. 4.

The number of triangles and associated data stored in FIFO device 200 depend on the number of pipelines that input to FIFO device 200. TRI_ID identifies the triangle with which each incoming data entry is associated, and controller 429 schedules the order in which ALU 401 processes the data ALU 401 receives. For example, if ALU 401 receives data (RDATA) from FIFO 200 at the same time as it receives header data from Header FIFO 425, controller 429 may decide that header data takes priority to RDATA and informs ALU 401 to process the header data prior to RDATA. Controller 429 sends a Mode signal to ALU 401 to indicate the type (i.e. header, attribute, etc.) of data ALU 401 is receiving.

In the embodiment shown in FIG. 4, six pipelines are used in conjunction with FIFO device 200, and data associated with six distinct triangles may be processed by ALU 401 simultaneously. Furthermore, each triangle may either be rendered or rejected/culled. If a triangle is to be rejected/culled, a bit stored in a flip flop corresponding to the triangle is set to logical one. In the embodiment shown in FIG. 4, six distinct triangles may be processed by ALU 401 simultaneously, and each of the six triangles corresponds to flip flops DFF0, DFF1, DFF2, DFF3, DFF4, and DFF5 respectively, wherein each flip flop stores a bit that indicates whether the corresponding triangle is rejected/culled. Referring now back to step 705, in addition to writing the header data to Header FIFO 425 and ALU 401, a bit stored in the flip flop corresponding to the triangle is set to logical zero to indicate that the triangle has not yet been rejected or culled. Furthermore, the corresponding flip flop is identified by matching an information segment of the valid entry such as TRI_ID shown in FIG. 4 with one of the flip flops DFF0, DFF1, DFF2, DFF3, DFF4, and DFF5.

In step 707, the header is processed in ALU 401 and a bit in header_processed register 419 corresponding to TRI_ID of the valid entry is set to logical one in step 709 when the header data is processed. Subsequently in step 711, ALU 401 determines if the triangle is rejected or culled according to the header data. If the triangle is rejected or culled (i.e. not to be rendered), ALU 401 sets a culled bit stored in rejected/culled register 433 to one, wherein the bit corresponds to the rejected/culled triangle. Furthermore, the culled bit triggers the flip flop corresponding to the rejected/culled triangle to set its content to logical one in step 713. In an illustrated example, ALU 401 processes the header of triangle0 and determines that triangle0 is rejected/culled. ALU 401 then sets the bit culled0 stored in register 433 to one. Culled0 triggers DFF0 to set its content to one, indicating that the triangle is rejected/culled. Conversely, if the triangle is not rejected or culled, the bit stored in the flip flop corresponding to the triangle is set to logical zero in step 717.

Referring now back to step 703 of FIG. 7. If the valid entry is not a header, in step 706, a bit stored in a flip flop corresponding to TRI_ID of the valid entry is checked to determine if the triangle corresponding to the valid entry is rejected or culled. If the triangle corresponding to the valid entry is rejected or culled, in step 708, the valid entry is prevented from being written to FIFO device 200.

Conversely, if the triangle corresponding to the valid entry is not rejected or culled, in step 710, the current TRI_ID is compared to the TRI_ID of the previous valid entry to determine if data associated with a new triangle is being written to FIFO device 200. Comparator 421 takes the current TRI_ID as one of two inputs, the current TRI_ID is also coupled to a flip flop 423 and the output of flip flop 423 (i.e. TRI_ID of the valid entry processed in the previous clock cycle) is coupled to the second input of comparator 421. Comparator 421 compares the current triangle ID to the previous triangle ID and outputs a signal to TRI_PTR FIFO 427, wherein the signal indicates whether a new triangle is being written to FIFO device 200.

Referring now back to step 710 of FIG. 7, if the output of comparator 421 signifies that the current triangle ID equals to the previous triangle ID, indicating the current valid entry and the previous valid entry are associated with the same triangle; the data portion of the valid entry along with additional parameter information such as TRI_ID and is_last_entry are then written into FIFO device 200 in step 714.

If the output of comparator 421 signifies that data associated with a new triangle is being written to FIFO device 200, TRI_PTR FIFO 427 is updated and the data portion of the valid entry along with additional parameter information such as TRI_ID and is_last_entry are written into FIFO device 200 in step 712.

TRI_PTR FIFO 427 is a conventional FIFO device comprising storage capacity of M words wherein M equals to the number of pipelines used. As an illustrative example, TRI_PTR FIFO 427 shown in FIG. 5 comprises a storage capacity of six data words. Furthermore, when TRI_PTR FIFO 427 is updated such as it is in step 712 of FIG. 7, the base address of the new triangle base_addr is written into the address held in write pointer WP (shown in FIG. 5), and the WP is then incremented by one to point to the next data word.

Figure 5:
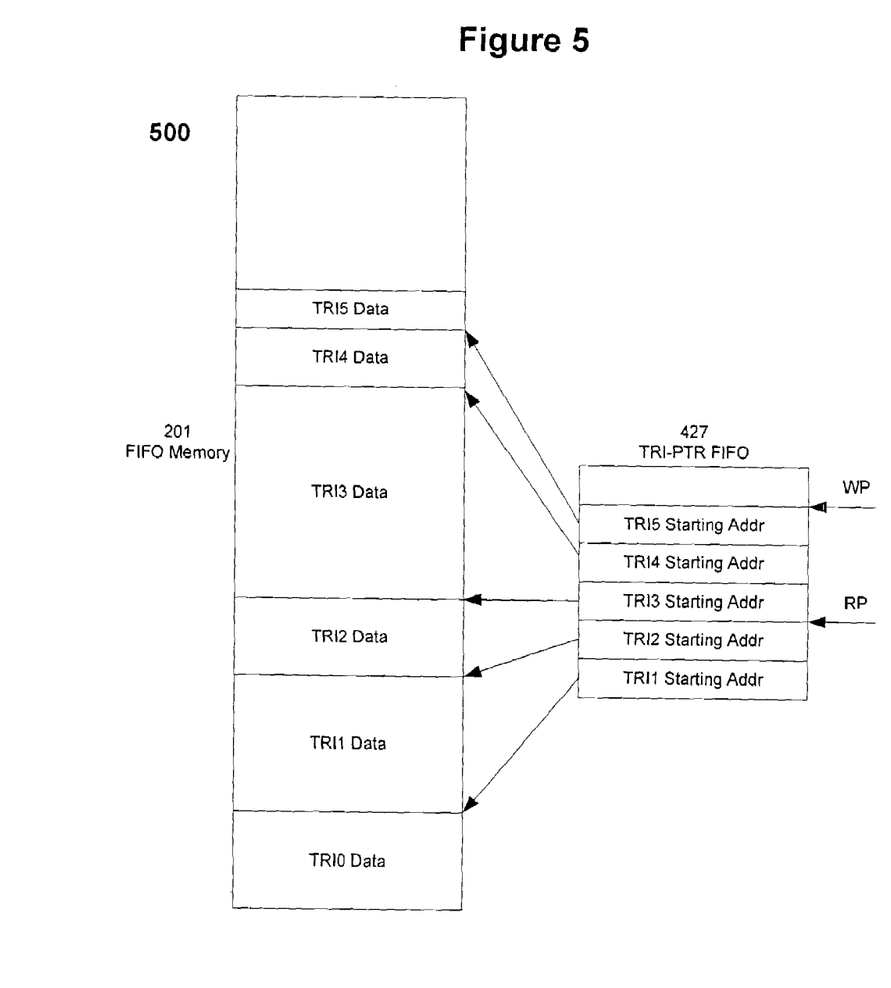
FIG. 5 is a diagram illustrating a TRI_PTR FIFO comprising five address pointers according to one embodiment of the present invention.

In one embodiment of the present invention shown in FIG. 5, TRI_PTR FIFO 427 comprises five data entries wherein each data entry comprises an address corresponding to the base address of triangles TR1, TR2, TR3, TR4, and TR5 respectively. TRI_PTR FIFO 427 shown in FIG. 5 indicates that either all six triangles will be rendered and therefore not rejected/culled, or some data entries associated with one or more rejected/culled triangles were written to FIFO device 200 before the corresponding headers were processed.

Figure 6:
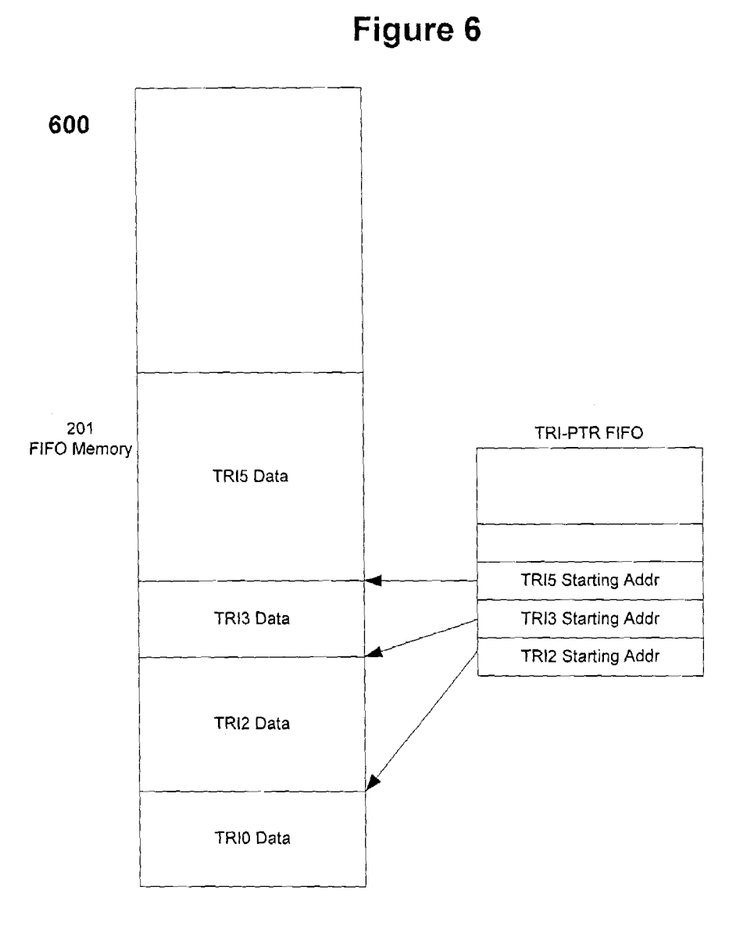
FIG. 6 is a diagram illustrating a TRI_PTR FIFO comprising three address pointers according to a second embodiment of the present invention.

In an alternative embodiment of the present invention shown in FIG. 6, TRI_PTR FIFO 427 comprises only three data entries wherein each data entry comprises an address corresponding to the base address of triangles TR2, TR3, and TR5, respectively. TRI_PTR FIFO 427 shown in FIG. 6 indicates that at least TR1 and TR4 are rejected/culled and the corresponding headers were processed before any data associated with either triangle was written to FIFO device 200.

Figure 8:
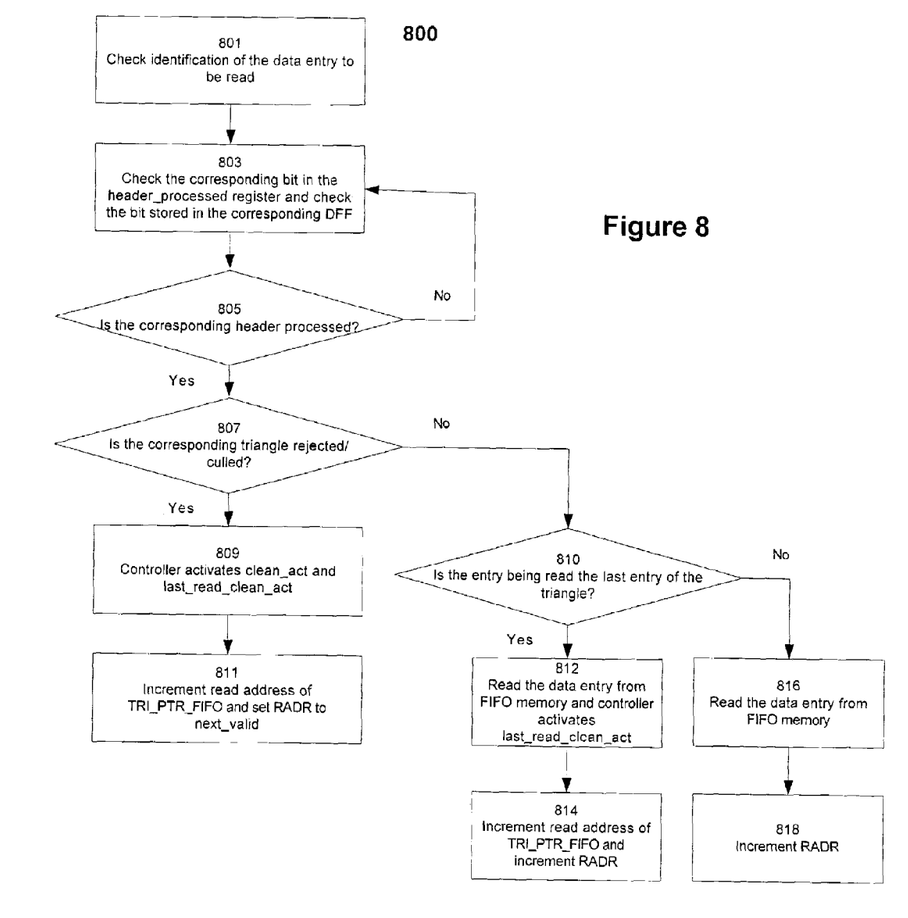
FIG. 8 is a flow diagram illustrating a detailed read operation of the architectural diagram shown in FIG. 4 according to one embodiment of the present invention.

FIG. 8 is a flow chart diagram illustrating functional steps for a read operation in a control circuit such as shown in FIG. 4. In step 801, the control circuit extracts the identification of the data entry to be read, the identification may be an ID tag such as TRI_ID stored along with the data in FIFO device 200. Moreover, the identification information extracted in step 801 identifies the triangle with which the data entry is associated.

In step 803, a bit corresponding to the extracted triangle ID TRI_ID in a header_processed register such as register 419 shown in FIG. 4 is checked along with a bit stored in a flip flop corresponding to the triangle ID TRI_ID. For example, for a TRI_ID of 0, HP0 and the bit stored in DFF0 are checked in step 803. If the corresponding bit in the header_processed register indicates that the header for the triangle has yet been processed (i.e. header_processed bit=logical zero) in ALU 401, in step 805, the read operation is not performed and step 803 is repeated until the corresponding header has been processed. If the header has been processed in step 803 and the triangle is rejected/culled as indicated by the bit stored in the corresponding flip flop, in step 809, controller 429 activates (i.e. set to logical one) two signals clean_act (shown in FIG. 2 and FIG. 4) and last_read_clean_act (shown in FIG. 4).

In step 811, the read address held by RP (shown in FIG. 5) is incremented by one and RADR (shown in FIG. 2 and FIG. 4) is set to the address held by the next_valid (shown in FIG. 2 and FIG. 4) pointer. When the signal last_read_clean_act is activated, TRI_PTR FIFO 427 increments a read address held by a read pointer such as RP (shown in FIG. 6) to the next data entry in TRI_PTR FIFO 427. Moreover, when the clean_act signal is activated, TRI_PTR FIFO 427 performs a read operation and outputs the read data to the next_valid pointer (shown in FIG. 2 and FIG. 4).

Referring now back to step 807. If the triangle is determined as not rejected or culled after the header is processed in ALU 401, in step 810, a verification is made to check if the data entry to be read is the last entry of the triangle associated with the data entry. If the data entry read is not the last entry of the triangle associated with the data entry, in step 816, a read operation is performed in FIFO device 200 and RADR (shown in FIG. 2) is incremented by one. The data (RDATA) read from FIFO device 200 is output to ALU 401 and identification tags such as TRI_ID, is_header, and is_last_entry are output to controller 429 via output 431 as shown in FIG. 4.

Conversely, if the data entry read is the last entry of the triangle associated with the data entry, in step 812, a read operation is performed in FIFO device 200 and controller 429 activates (i.e. set to logical one) signal last_read_clean_act (shown in FIG. 4). The data read by FIFO device 200 is output to ALU 401 and identification tags such as TRI_ID, is_header, and is_last_entry are output to controller 429 via output 431 as shown in FIG. 4. Furthermore, when the signal last_read_clean_act is activated, TRI_PTR FIFO 427 increments a read address held by a read point such as RP (shown in FIG. 6) to the next data entry in TRI_PTR FIFO 427. Subsequently in step 814, RADR (shown in FIG. 2) and the reader address held by RP (shown in FIG. 5) are each incremented by one.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the arts to best utilize the invention and various embodiments with various modifications as are suited to the particular use contemplated. It is intended that the scope of the invention be defined by the claims appended hereto and their equivalents.

For example, FIG. 7 illustrates a single write operation. In another embodiment of the present invention, pipelining is used in conjunction with a control circuit such as shown in FIG. 4 and several data entries may be held in numerous threads simultaneously, the order in which the data entries are processed is scheduled by a controller such as controller 429.

Moreover, valid entry 417 shown in FIG. 4 comprises five segments. In another embodiment of the present invention, the valid entry may be divided into greater or fewer segments according to desired design parameters. FIG. 4 illustrates six pipelines, in another embodiment of the present invention, a greater or fewer number of pipelines may be used.

Bit signals such as last_read_clean_act, is_header, is_last_entry, valid, clean_act, bits stored in header_processed register, and bits stored in DFF0, DFF1, DFF2, DFF3, DFF4, and DFF5 are set to logical one to correspond to a TRUE state and set to logical zero to correspond to a FALSE state, various representations of the two states may be used without altering the essence of the invention.

I claim:

1. A method of optimally performing read operations in a first FIFO device with a control circuit coupled to the first FIFO device, the method comprising:
   a) detecting an asserted read enable signal at the first FIFO device, wherein a first read pointer holds an address to the data entry to be read in a first FIFO memory in the first FIFO device;
   b) detecting one or more obsolete data entries starting at the address held by the first read pointer;
   c) loading the address of the next valid data entry into the first read pointer;
   d) receiving a valid entry at the control circuit; and
   e) determining whether the received valid entry is a header entry.

2. The method of claim 1, further comprising the step of detecting an asserted write enable signal at the first FIFO device, wherein a first write pointer holds an address to be written to in the first FIFO memory.

3. The method of claim 1, wherein the valid entry comprises graphics related data.

4. The method of claim 3, wherein the valid entry comprises data associated with a triangle.

5. The method of claim 1, wherein the received valid entry is a header entry.

6. The method of claim 5, wherein the header entry comprises an identification tag for identifying the triangle.

7. The method of claim 6, further comprising the step of writing the received header entry into a second FIFO device, setting a bit stored in a flip flop to logical zero wherein the flip flop corresponds to the triangle, sending the header data of the received header entry to an arithmetic logic unit (ALU) wherein the ALU is included in the control circuit, and sending the identification tag to a controller coupled to the ALU.

8. The method of claim 7, further comprising the step of processing the header data sent to the ALU.

9. The method of claim 8, further comprising the step of setting a bit in a register coupled to the ALU to logical one, wherein the bit corresponds to the triangle.

10. The method of claim 9, further comprising the step of determining whether the triangle is rejected or culled.

11. The method of claim 10, wherein the triangle associated with the header entry is not rejected or culled.

12. The method of claim 11, further comprising the step of setting the bit stored in the flip flop associated with the triangle to logical zero.

13. The method of claim 10, wherein the triangle is rejected or culled.

14. The method of claim 13, further comprising the step of setting the bit stored in the flip flop associated with the triangle to logical one.

15. The method of claim 1, wherein the received valid entry is not a header entry.

16. The method of claim 15, wherein the valid entry comprises a first identification tag for identifying the triangle with which the received valid entry is associated.

17. The method of claim 16, wherein the valid entry comprises a second identification tag for differentiating the last valid entry associated with the triangle.

18. The method of claim 17, further comprising the step of determining whether the triangle is rejected or culled.

19. The method of claim 18, wherein the triangle is not rejected or culled.

20. The method of claim 19, further comprising the step of determining whether a new triangle is being written to the first FIFO device.

21. The method of claim 20, wherein the determining step further comprises the step of comparing the first identification tag of the current valid entry to a third identification tag of the previous valid entry wherein the third identification identifies the triangle with which the previously received valid entry is associated.

22. The method of claim 21, wherein the new triangle is not being written to the first FIFO device.

23. The method of claim 22, further comprising the step of writing the valid entry to the first FIFO memory at the address held by the first write pointer.

24. The method of claim 21, wherein the new triangle is being written to the first FIFO device.

25. The method of claim 24, further comprising the step of writing the valid entry to the first FIFO memory at the address held by the first write pointer, and updating a second FIFO device wherein the second FIFO device is coupled to the first FIFO device.

26. The method of claim 25, wherein the updating step further comprising writing the address held by the first write pointer into the second FIFO device and incrementing a second write pointer by one wherein the second write pointer holds an address to be written to a second FIFO memory of the second FIFO device.

27. The method of claim 18, wherein the triangle is rejected or culled.

28. The method of claim 27, wherein the valid entry is not written into the first FIFO device.

29. A method of optimally performing read operations in a first FIFO device with a control circuit coupled to the first FIFO device, the method comprising:
- detecting an asserted read enable signal at the first FIFO device, wherein a first read pointer holds an address to the data entry to be read in a first FIFO memory in the first FIFO device;
- checking a first identification tag of the data entry;
- detecting one or more obsolete data entries starting at the address held by the first read pointer;
- loading the address of the next valid data entry into the first read pointer; and
- detecting an asserted write enable signal at the first FIFO device, wherein a first write pointer holds an address to be written to in the first FIFO memory.

30. The method of claim 29, wherein the valid entry to be read is graphics related data.

31. The method of claim 30, wherein the valid entry comprises data associated with a triangle.

32. The method of claim 31, wherein the first identification tag of the valid entry identifies the triangle.

33. The method of claim 32, further comprising the step of checking a bit corresponding to the triangle in a register to verify whether a header entry of the triangle has been processed.

34. The method of claim 33, wherein the header entry of the triangle has been processed.

35. The method of claim 34, further comprising the step of determining whether the triangle is rejected or culled.

36. The method of claim 35, wherein the triangle is not rejected or culled.

37. The method of claim 36, further comprising the step of determining if the data entry to be read is the last entry of the triangle.

38. The method of claim 37, wherein the determining step further comprising the step of checking a second identification tag of the data entry, wherein the second identification tag differentiates the last data entry of the triangle.

39. The method of claim 38, wherein the data entry to be read is the last entry of the triangle.

40. The method of claim 39, further comprising the step of reading the data entry from the first FIFO memory at the address held by the first read pointer.

41. The method of claim 40, further comprising the step of incrementing by one the address held by the first read pointer, and incrementing the address held by a second read pointer by one wherein the second read pointer holds an address in a second FIFO device coupled to the first FIFO device.

42. The method of claim 38, wherein the data entry to be read is not the last entry of the triangle.

43. The method of claim 42, further comprising the step of reading the data entry from the first FIFO memory at the address held by the first read pointer, wherein the data of the data entry is read into an algorithmic logic unit (ALU) included in the control circuit and identification tags of the data entry are read into a controller coupled to the ALU.

44. The method of claim 43, further comprising the step of incrementing by one the address held by the first read pointer.

45. The method of claim 35, wherein the triangle is rejected or culled.

46. The method of claim 45, further comprising the step of setting a first signal to logical one, wherein the first signal signifies to the first FIFO device that the next one or more data entries are obsolete.

47. The method of claim 46, further comprising the step of performing a read operation in a second FIFO device coupled to the first FIFO device wherein the output of the read operation is loaded into the first read pointer of the first FIFO device, and incrementing the address held by a second read pointer by one wherein the second read pointer holds an address in the second FIFO device.

48. The method of claim 33, wherein the header entry of the triangle has not been processed.

49. The method of claim 48, further comprising the step of repeating the checking step of claim 33.

50. A method of optimally performing write operations in a first FIFO device with a control circuit coupled to the first FIFO device, the method comprising:
- a) detecting an asserted write enable signal at the first FIFO device, wherein a first write pointer holds an address to be written to in the first FIFO memory;
- b) detecting one or more obsolete data entries starting at the address held by the first write pointer;
- c) loading the address of the next valid data entry into the first write pointer;
- d) receiving a valid entry at the control circuit; and
- e) determining whether the received valid entry is a header entry.

* * * * *